Dec. 10, 1935.  A. C. KLECKNER  2,023,423
STRAINER
Filed April 20, 1934  2 Sheets-Sheet 1
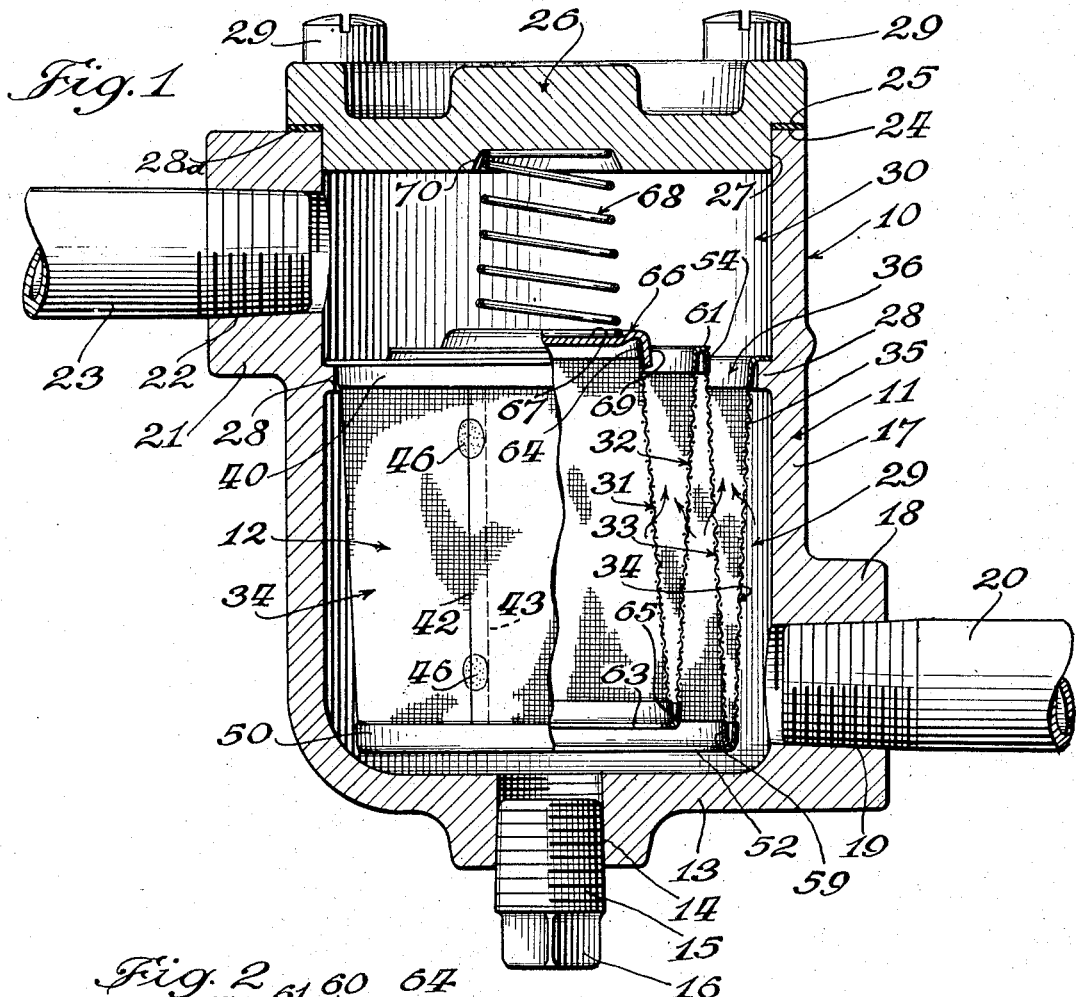
Fig. 1
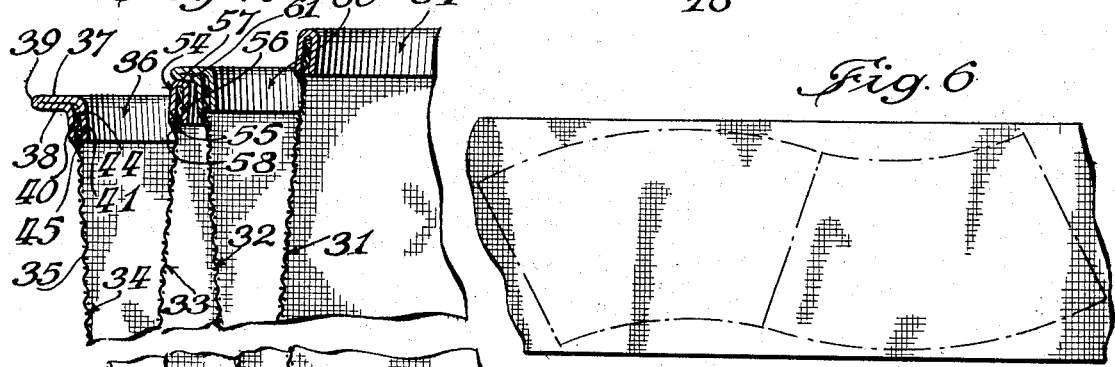
Fig. 2
Fig. 6
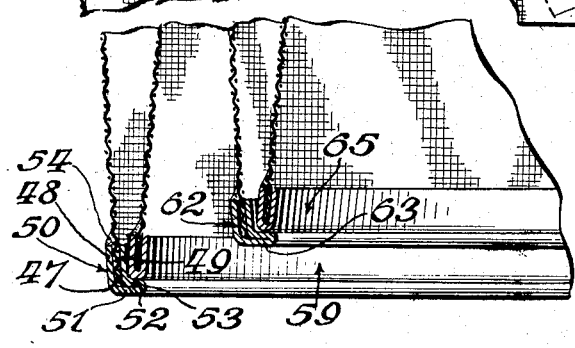
Inventor:
Arthur C. Kleckner
By
Williams, Bradbury, McCaleb & Hinkle
Attys.

Dec. 10, 1935.  A. C. KLECKNER  2,023,423
STRAINER
Filed April 20, 1934  2 Sheets-Sheet 2
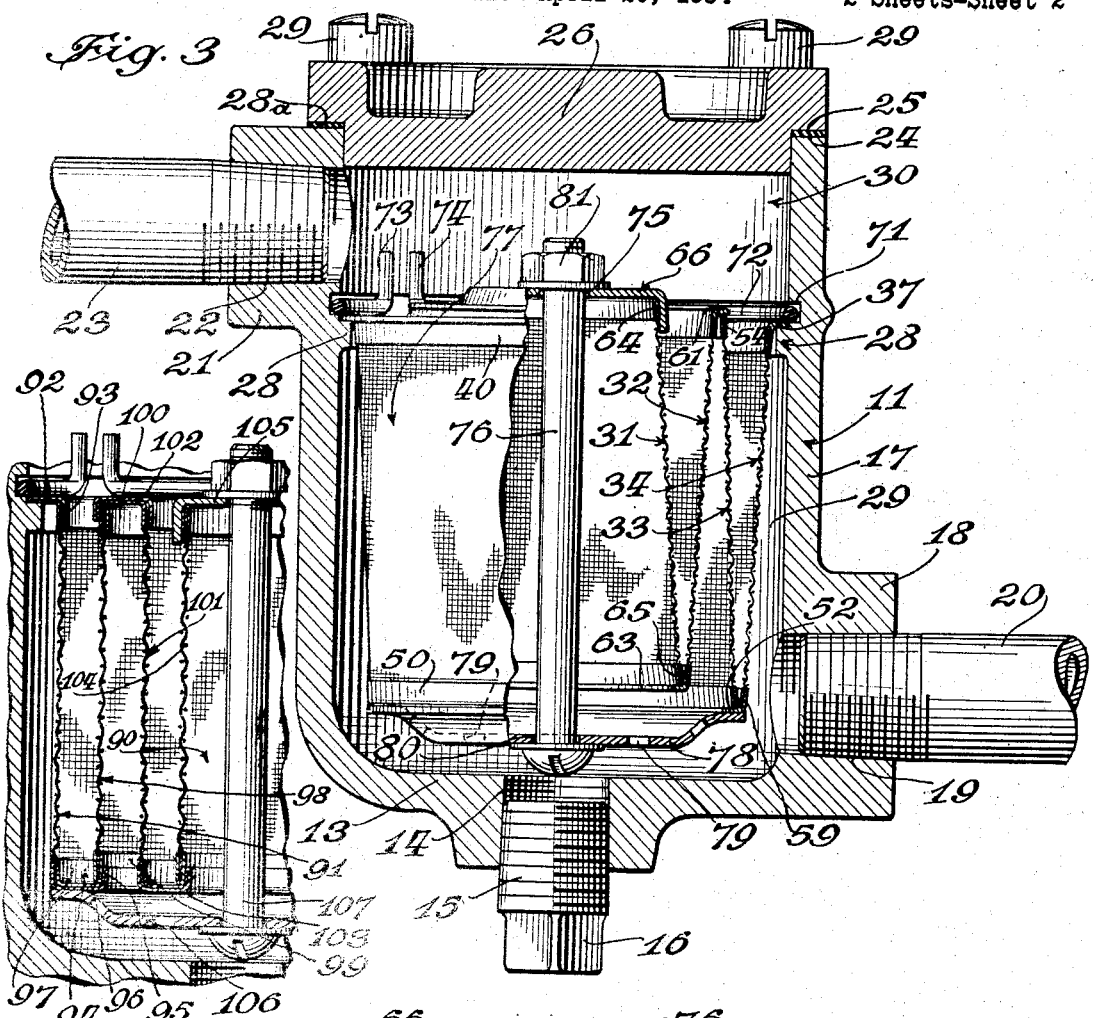
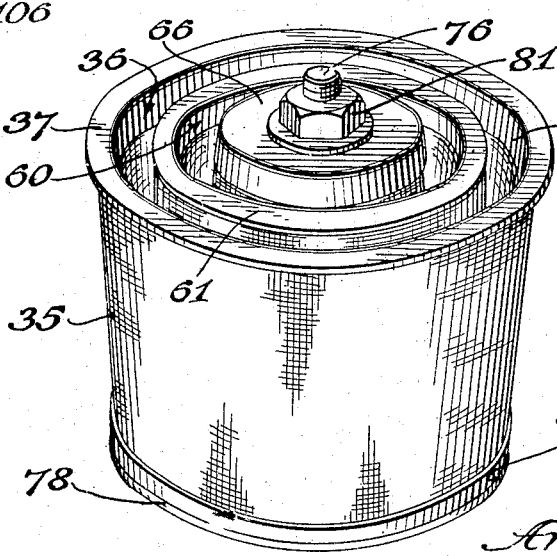
Inventor:
Arthur C. Kleckner
By Williams, Bradbury, McCaleb & Hinkle
Attys.

Patented Dec. 10, 1935

2,023,423

UNITED STATES PATENT OFFICE 2,023,423

STRAINER

Arthur C. Kleckner, Racine, Wis., assignor to Webster Electric Company, Racine, Wis., a corporation of Wisconsin Application April 20, 1934, Serial No. 721,448

1 Claim. (Cl. 210—165)

The present invention relates to strainers, and is particularly concerned with strainers intended to be used for the fuel supply lines of oil burners, but I desire it to be understood that such strainers are of general application and may be used in many different fields, and I do not wish to be limited to any particular type of use.

One of the objects of the invention is the provision of an improved strainer unit in which the straining area is greatly increased over the devices of the prior art which occupy the same amount of space.

Another object of the invention is the provision of an improved strainer unit which is so separable in its elements that the straining element may be brushed or cleaned on both the inside and the outside.

In some devices of the prior art the strainer elements may be cleaned or brushed on the outside, but can only be cleaned on the inside with difficulty, and, as cleaning on the outside tends to force some of the foreign matter through the screen, such foreign matter would naturally be inside the screen and on that side of the strainer toward the burner, which is a disadvantage that I desire to eliminate in the present invention.

Another object of the invention is the provision of an improved strainer of the class described in which the strainer unit may be removed as a complete unit from its housing.

Another object of the invention is the provision of an improved strainer unit of the class described, the various elements of which are capable of economical manufacture and assembly and which are sturdy, serviceable, capable of being easily cleaned, and capable of long service without necessity for repair.

Another object of the invention is the provision of an improved strainer unit, the elements of which lend themselves peculiarly to manufacture by stamping and pressing operations so that the devices may be manufactured at a very low cost and placed within the reach of a vast number of users.

Other objects and advantages of the invention will be apparent from the following description in which similar characters of reference indicate similar parts throughout the several views.

Referring to the drawings, of which there are two sheets, Fig. 1 is a vertical sectional view with part of the strainer in elevation, the section being taken on a plane passing through the axis of the substantially cylindrical strainer housing and also passing through the inlet and outlet of the strainer housing;

Fig. 2 is an enlarged fragmentary sectional view of a portion of the strainer unit, showing the details of construction of the parts of the strainer;

Fig. 3 is a view similar to Fig. 1 of a modification in which the strainer unit may be removed from the housing as a complete unit;

Fig. 4 is a view in perspective of the strainer unit of Fig. 3;

Fig. 5 is a view similar to Fig. 2 of a modification in which the screens are cylindrical in form and the sheet metal connecting rings are adapted to span the space between the cylindrical screens.

Fig. 6 is a diagrammatic view of the pattern for the screen of the strainer elements.

Referring to Fig. 1, 10 indicates in its entirety the complete strainer, having a housing 11 and a strainer unit assembly indicated by the numeral 12. The housing 11 preferably consists of a substantially cylindrical cast metal container having a flat bottom 13 with a clean-out opening 14 closed by a threaded clean-out plug 15 having a non-circular head 16. The housing 11 has a substantially cylindrical outer wall 17 which is preferably provided at its bottom on one side with an outwardly extending lug 18 having a threaded inlet opening 19 which may be connected to an inlet pipe 20. At its opposite side, and preferably near the top, it is also provided with an outwardly extending lug 21 having a threaded outlet opening 22 connected to the outlet pipe 23. The housing 11 is preferably open at its upper end, being provided with a flat upper seating surface 24 for engaging a complementary flat annular surface 25 on the cover 26.

Cover 26 may be a substantially circular flat cast metal member provided with a reduced cylindrical portion 27 which is adapted to fit within the cylindrical wall 17 of the housing 11. A gasket 28a of rubber or other suitable material is compressed between the surface 25 on the cover and the seating surface 24 on the housing, and the cover is secured in place by a plurality of screw bolts 29 passing through apertures in the cover and threaded into threaded bores in the cylindrical wall 17.

The housing is provided with an inwardly extending annular rib 28 located between the inlet and the outlet and preferably upward toward the outlet so as to make the strainer chamber 29 as large as possible, the space above the strainer being called the outlet chamber 30.

The strainer unit assembly 12 preferably comprises a multiplicity of frusto-conical strainer members 31, 32, 33, 34, which are assembled to provide the unit shown at 12 in Fig. 1. The largest of these strainer members or elements 34 comprises a frusto-conical piece 35 of foraminous material, such as fine mesh screen of non-corrodible material, such as Monel metal, carried by an upper collar 36.

The upper collar 36 has its details of structure shown in Fig. 2 and also comprises a sheet metal member preferably formed of non-corrodible material, such as thin Monel metal. The collar comprises an annulus having two outwardly extending flanges 37, 38 joined together by a fold 39 and carrying the two downwardly extending flanges 40, 41 which are spaced from each other sufficiently to receive the screen 35.

Each of the pieces of screen 35 comprises a member which has two curved edges, which are substantially concentric with each other, and two radially extending straight edges, as shown in Fig. 6. The straight edges of the screen are brought together and overlapped slightly, as shown in Fig. 1, at the edges 42, 43. The upper curved edge 44 may then be inserted between the flanges 40, 41 and secured there by clamping those flanges together, or preferably by soldering, as at 45, at various spaced spots about the periphery of the collar 36.

The overlapped ends 42, 43 of the screen are also secured together by spaced spots of solder 46, and the lower edge 47 of the screen is inserted between the flanges 48, 49 of the lower collar 50, which also has two inwardly extending flanges 51, 52 joined by a fold 53. Here, again, the screen may be clamped between the flanges 48, 49, but is preferably secured in place by solder spots 54.

The collar 36 is of sufficient size so that it fits inside the cylindrical chamber 30 at the top of the strainer housing and rests upon the annular rib 28 with the flange 40 located inside the rib 28.

The collar 50 is naturally of lesser diameter, as the diameter at the smaller end of the frusto-conical screen is less, and collar 50 is supported in the housing 29 with the screen 35 in such position that the screen 35 is spaced from the wall 17, leaving room for the liquid to gain access to all of the area of the screen 35.

The next smaller frusto-conical strainer element 33 is made of a blank of similar shape and substantially the same width, but of less length between the straight edges thereof. The straight edges of this piece of screen are brought into overlapping relation and secured in the same manner as shown at 42, 43, 46.

The upper edge of the frusto-conical screen is preferably protected by a sheet metal member 54 comprising a pair of downwardly extending flanges 55, 56 joined by a hairpin bend 57, but the flanges 55, 56 are spaced from each other sufficiently to receive the screen in the groove between them.

Collar 54 is secured on the upper edge of the screen element 34 by means of spots of solder 58 located at regularly spaced points about the periphery. The lower edge of strainer element 34 carries another protecting sheet metal collar 59, which is similar in structure to the collar 54 just described, and collar 59 is adapted to rest on the inwardly extending flange 52 of the strainer element 34. The strainer element 32 may be exactly similar in structure to the strainer element 34 previously described except that the upper collar 60 is smaller in size and adapted to have its horizontal flange 61 rest on top of the collar 54.

The lower collar 62 on strainer element 32 also has a horizontal flanged portion 63, which supports the collar 65 carried by the lower edge of strainer element 31. Strainer element 31 may be exactly similar in structure to strainer element 34 except that it is smaller in size and provided with smaller protecting collars 64, 65 at the top and bottom.

The angularity of these frusto-conical screens may be varied as between the different collars, but the angularity should preferably be such that there is free access of the liquid in the chamber 29 to the space between the various screens, so as to utilize all of the screen area of the elements 31 to 34.

The provision of frusto-conical screen members of the same angularity in each case insures equal space between the various screens, and any number of screen elements may be employed, depending upon the results sought to be accomplished.

An increase in the number of screen elements in a given space increases the screen area, but may decrease the space between the screens and the space between the screens should be kept such that there is free access of the liquid to all parts of the screen.

Referring again to Fig. 1, it will be observed that screen element 34 rests on the rib 28, screen element 33 rests on horizontal flange 52, screen element 32 has its horizontal flange 61 resting on the top of screen element 33, and screen element 31 has its lower edge resting on the horizontal flange 63 of screen element 32.

The open upper end inside the collar 64 of screen element 34 is preferably closed with a cap 66 consisting of a sheet metal member formed with a depression 67 to provide a seat for a spring 68, and with a downwardly extending flange 69 embracing the outside of the collar 64.

The cover 26 is preferably formed with a shallow cylindrical bore or recess 70 forming a seat for the upper end of spring 68, and spring 68 is compressed between the cover and the cap 66. The pressure of the spring 68 on the cap 66 and screen element 31 holds all of the screen elements in the position shown in Fig. 1 and keeps the parts in proper position in the embodiment of Fig. 1.

The operation of a screen of this type will be evident from a study of Fig. 1. Fuel oil or other liquid to be strained comes in at the inlet 20 and passes through screen elements 31—34 in the direction of the arrows shown in Fig. 1, emerging into the chamber 30 between the collars 36, 60, 64 at the top, and thence to the outlet pipe 23.

Referring to Fig. 3, this is a modification in which the housing 11 may be substantially similar in structure to that previously described except for the provision of an annular groove 71 of substantially rectangular cross section located immediately above the partition rib 28, but spaced sufficiently therefrom to leave room for the flanges 37, 38 between the rib 28 and a spring wire 72, which is sprung outward into the groove 71 to retain the strainer elements in proper position. Spring wire 72 is preferably provided with two inwardly turned and upwardly turned ends 73, 74, which may be grasped by a pair of pliers to retract the wire from the groove 71 and effect a withdrawal of the wire from the housing.

In this embodiment the strainer elements 31—34 may be exactly as described in the preceding embodiment, but they are preferably secured together to form a unit which may be removed in its entirety from the housing 11. For this purpose the cap 66 is provided with a centrally located bore 75 for passing an assembly bolt 76.

The lower end of the strainer unit 77 is provided with a perforated metal plate 78 having the apertures 79 for passage of the liquid and having a centrally located aperture 80 for passing the bolt 76.

Plate 78 engages the flange 52 on the outermost strainer element 34. The nut 81 on bolt 76 draws the strainer elements 31—34 together, and by means of the cap 66 and plate 78 holds them together in one unit by virtue of the opposed relation of the various parts of these strainer elements 31—34, which permits them all to be clamped together by these members engaging the outermost strainer elements.

Referring to Fig. 5, this is a modified form of strainer unit in which the screens are of substantially cylindrical form. It will thus be noted that the screens are not necessarily always frusto-conical, provided they are sufficiently spaced to permit the access of the liquid to the screen surface both for inflow and outflow.

In this case the screen unit is designated in its entirety by the numeral 90. The outermost screen 91 is provided at its upper edge with a stamped metal ring having a pair of outwardly extending flanges 92 and a pair of downwardly extending flanges 93, between which is clamped the upper edge of the screen 91. In every case the screen may be secured by clamping and/or soldering at convenient points.

The lower edge of the screen 91 is secured to an annular member 94 having an upwardly extending cylindrical flange 95, radially extending flanges 96, and a pair of upwardly extending flanges 97, between which is located the screen 91. The next smaller screen 98 may be cylindrical in form and adapted to fit within the upwardly extending flange 95 of the lower annular member 94, and this screen 98 is merely provided with reinforcing sheet metal members of substantially U shape in section and circular in plan, indicated by the numerals 99, 100. The next smaller screen member 101 is provided at its upper end and lower end with the annular members 102, 103, similar in shape to the annular member 94, previously described, while the next screen member 104 may be similar in construction to screen 98. These screens may be secured in place by means of a spring which bears down on the cap 105 and secures it in place, or they may be secured together as a unit by means of the cap 105 and lower plate 106 which are secured together by a bolt 107, thereby enabling the removal of all of the screens as a complete strainer unit. If desired, some of the screens may be frusto-conical in form and some cylindrical. They are preferably circular in plan, but it is readily conceivable that they might be made of any geometric shape in plan, provided the screens were sufficiently spaced from each other to accomplish the result desired.

The liquid flows in between the screens 98 and 101 and within the screen 104 and out from between the screens 91 and 98, 101 and 104 at the top.

It should also be noted that in the embodiment of Fig. 4 the innermost screen member might be conical in form.

In other embodiments of the invention the outermost strainer unit may rest on the floor or bottom 13 of the housing, if spacer means is provided to space the plate 78 from the bottom 13 to permit access of liquid to the annular strainers. In such embodiments of the invention the bolt 76 may extend in from the top and be threaded into the clean-out aperture 14, which may be made of smaller size.

The present strainer elements may be taken apart in both embodiments and brushed on the inside and outside to effect a cleaning of the screen. Such brushing is more effective because both sides of the screen are accessible and there is no possibility of brushing foreign material into the interior of the strainer where it cannot be removed. Furthermore, the strainer area of the screen is greatly increased, for a given space, over that of the strainers of the prior art.

The present device may be made much more effective and much more compact than the devices of the prior art.

The devices are also capable of very economical manufacture, as the pattern is simple and the assembly can be made very quickly with the collars that are stamped out of sheet metal. Thus the devices may be made at a low cost, which is an important factor in comparison with the more expensive strainer elements of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

In a strainer, the combination of a metal housing formed with a chamber open at one end and having an inwardly extending supporting rib located intermediate its ends, said chamber having an outlet on one side of said rib and an inlet formed on the other side of said rib, and a strainer device removable as a unit, said strainer device comprising an outermost wire strainer element having its ends joined together to form a round member, said round member having a metallic supporting ring at one end provided with an outwardly extending flange resting on said rib, and said round member having a retaining ring at its opposite end provided with an inwardly extending flange, a second round strainer member resting on said inwardly extending flange and located in said first round strainer member, and additional strainer members successively resting upon each other and located within the first-mentioned strainer members, a cap closing the upper end of the innermost of said strainer members, and a perforated plate engaging said inwardly extending flange at the opposite end of said strainer members, and a threaded member extending through said cap and plate and drawing said cap and plate together to clamp all of said strainer members into a unit, said housing having a groove in its wall located above said inwardly extending rib and a resilient metal member located partially in said groove and extending above said outwardly extending flange to hold said strainer unit in place in said housing.

ARTHUR C. KLECKNER.